(12) United States Patent
Evers et al.

(10) Patent No.: US 12,049,739 B1
(45) Date of Patent: Jul. 30, 2024

(54) MODULAR BODY COMPARTMENT

(71) Applicant: Altec Industries, Inc., Birmingham, AL (US)

(72) Inventors: Maria Evers, Osceola, IA (US); Robert Nichols, Saint Joseph, MO (US); Austin Graham, Kansas City, MO (US); Robert A. Berry, Fincastle, VA (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/395,983

(22) Filed: Dec. 26, 2023

(51) Int. Cl.
| | |
|---|---|
| *E02F 3/38* | (2006.01) |
| *B60R 9/02* | (2006.01) |
| *B60R 9/06* | (2006.01) |
| *B62D 3/02* | (2006.01) |
| *B62D 21/09* | (2006.01) |
| *B62D 25/20* | (2006.01) |
| *B62D 27/06* | (2006.01) |
| *B62D 33/02* | (2006.01) |
| *E02F 3/36* | (2006.01) |

(52) U.S. Cl.
CPC ............. *E02F 3/382* (2013.01); *B62D 27/06* (2013.01); *B62D 33/02* (2013.01); *B60R 9/02* (2013.01); *B60R 9/06* (2013.01); *B60Y 2200/49* (2013.01); *B62D 21/09* (2013.01); *B62D 25/2054* (2013.01); *E02F 3/3663* (2013.01)

(58) Field of Classification Search
CPC .... B62D 33/02; B62D 33/023; B62D 33/077; B62D 25/2054; B62D 27/06; B62D 21/09; E02F 3/382; E02F 3/84; B60R 5/04; B60R 5/041; B60R 9/02; B60R 9/06; B60R 11/06
See application file for complete search history.

(56) References Cited

U.S. PATENT DOCUMENTS

| | | | | |
|---|---|---|---|---|
| 5,486,084 | A * | 1/1996 | Pitman | E02F 3/384 |
| | | | | 212/300 |
| 5,511,848 | A * | 4/1996 | Mobley | B62D 25/2054 |
| | | | | 296/183.1 |
| 5,897,154 | A * | 4/1999 | Albertini | B60R 11/06 |
| | | | | 296/24.45 |
| 6,089,639 | A * | 7/2000 | Wojnowski | B62D 33/02 |
| | | | | 296/37.6 |

(Continued)

*Primary Examiner* — Gregory A Blankenship
(74) *Attorney, Agent, or Firm* — Erise IP, P.A.

(57) ABSTRACT

A modular subbase may comprise an upper surface, a longitudinal supporting structure coupled to the upper surface, one or more outrigger boxes coupled to the longitudinal supporting structure and the upper surface. The longitudinal supporting structure may comprise a wide sheet of metal comprising two upwardly-facing arms and a medial section adapted to be lightweight and to provide structural support to the upper surface. The longitudinal supporting structure and upper surface may comprise struts configured to prevent buckling of the medial section and the upper surface The modular subbase may be configured to couple to one or more modular bodies. The modular bodies may couple directly to the upper surface. A boom-arm pedestal for operating a boom-arm may be integrated into the upper surface and may be structurally supported by the modular subbase.

20 Claims, 7 Drawing Sheets

(56) References Cited

U.S. PATENT DOCUMENTS

| | | | | |
|---|---|---|---|---|
| 6,554,342 | B1* | 4/2003 | Burnett | B60R 9/02 |
| | | | | 224/403 |
| 9,499,203 | B1* | 11/2016 | Finley | B62D 29/043 |
| 9,988,086 | B1* | 6/2018 | Adkins, Jr. | B62D 25/2054 |
| 10,124,830 | B1* | 11/2018 | Finley | B62D 29/043 |
| 10,569,811 | B2* | 2/2020 | Lang | B62D 33/02 |
| 10,676,403 | B2* | 6/2020 | Oboodi | C04B 41/89 |
| 10,801,169 | B2* | 10/2020 | Roy | B60P 3/14 |
| 11,186,235 | B2* | 11/2021 | Klatt | B60P 3/14 |
| 11,932,314 | B2* | 3/2024 | Chumchal | B62D 33/02 |
| 2009/0072564 | A1* | 3/2009 | Teeple | B60P 1/548 |
| | | | | 296/10 |
| 2018/0281699 | A1* | 10/2018 | Furniss | B60R 9/06 |
| 2019/0023330 | A1* | 1/2019 | McKinney | B62D 33/02 |
| 2019/0193794 | A1* | 6/2019 | Beet | B62D 33/02 |
| 2019/0330811 | A1* | 10/2019 | Roy | E01F 9/70 |
| 2020/0247481 | A1* | 8/2020 | Barnicle | B60J 7/026 |
| 2020/0406985 | A1* | 12/2020 | Zhu | B62D 33/023 |
| 2021/0146842 | A1* | 5/2021 | Niemela | B60R 3/02 |
| 2022/0227430 | A1* | 7/2022 | Min | B60K 1/04 |
| 2023/0215903 | A1* | 7/2023 | Jeon | H01L 27/156 |
| | | | | 257/91 |
| 2023/0376042 | A1* | 11/2023 | Wittenschlaeger | |
| | | | | B62D 33/0207 |

* cited by examiner

MODULAR BODY COMPARTMENT

BACKGROUND

1. Field

Embodiments of the present disclosure relate to unified modular bodies for utility trucks. More specifically, embodiments of the present disclosure relate to modular bodies for utility trucks comprising removable multi-piece compartments and subbases.

2. Related Art

Utility bodies for use with utility trucks commonly include one or more components that are specific to the particular utility truck, such as one or more storage compartments for tools, materials, or other accessories, outriggers, and booms. Other utility truck components are also known, and the particular components mounted on a utility truck are dependent on the purpose for which the utility truck is to be used (e.g., for aerial work, for construction work, etc.). The utility truck components often provide significantly increased weight beyond a weight of the utility truck itself (e.g., a truck's body, engine, power take-off, etc.). Therefore, utility trucks frequently include the utility body for mounting the utility truck components (i.e., the storage compartments, boom, outriggers, etc.).

Traditionally, utility bodies for utility trucks are constructed in a single piece wherein the storage compartments and the subbase are integrated together into a single structure. For example, the storage compartments may be integrated onto a support structure of the subbase. Alternatively, the storage compartments may be integrated into a separate support structure independent from the subbase. Frequently, the storage compartments are mounted along the sides of a bed of the truck for easy access by the truck user. Therefore, the subbase and storage compartment assembly essentially comprise a length of at least the bed of the truck (to account for the storage compartments) and a width of the truck with the storage compartments (to account for the subbase to which the storage compartments are mounted). The utility body comprising the subbase and storage compartment assembly then presents a large footprint and envelope. Additionally, traditional utility bodies are assembled in place on a utility truck, such as welding the utility body to the truck chassis. The large footprint and envelope of the utility body combined with the conventional on-site assembly requires the utility body to be transported as a single unit, thereby increasing shipping costs and decreasing efficiency of delivery.

Furthermore, traditional utility truck bodies are designed to be mounted on top of the subbase of a utility truck. Traditionally, the body of the utility truck comprises two sets of body compartments (the compartments discussed above for holding tools, accessories, etc.) and a plurality of cross-members with a walking surface welded above the plurality of cross-members. The cross-members comprise steel or aluminum beams, which are desirable for providing structural support to the body compartments and to other components mounted on the utility truck, such as boom-arm support structures mounted to the walking surface. The thickness of the cross-members and general structure of traditional utility truck bodies results in significant weight of the vehicle, which increases cost, design requirements, and capabilities of the truck.

Further, traditional utility bodies are configured to movably rest upon the subbase via springs or other malleable suspension materials. Resting on springs causes low rigidity of the utility body, which in turn may cause torsion of the utility body during use thereby resulting in damage of the utility body.

SUMMARY

Embodiments of the present disclosure solve the above-mentioned problems by providing systems for unified modular bodies of utility trucks.

In some embodiments, the techniques described herein are directed to a modular subbase for mounting to a utility truck chassis, the modular subbase including: a longitudinal supporting structure configured to couple with the utility truck chassis, the longitudinal supporting structure including: a first upwardly-facing arm having a first arcuate trailing edge; a second upwardly-facing arm having a second arcuate trailing edge, the second upwardly-facing arm opposite the first upwardly-facing arm; and a medial portion disposed between the first upwardly-facing arm and the second upwardly-facing arm; an upper surface integrally coupled along at least a portion of a length of the longitudinal supporting structure, the upper surface including: a central portion; a first lateral edge extending beyond the longitudinal supporting structure, the first lateral edge having a first coupling surface; and a second lateral edge extending beyond the longitudinal supporting structure, the second lateral edge having a second coupling surface; a first modular body compartment removably mounted to the upper surface, the first modular body compartment including: a first storage cavity configured to extend perpendicularly regarding the upper surface; and a first lateral extending portion configured to rest on the first lateral edge; a second modular body compartment removably mounted to the upper surface, the second modular body compartment including: a second storage cavity configured to extend perpendicularly regarding the upper surface; and a second lateral extending portion configured to rest on the second lateral edge; and a boom arm pedestal integrally coupled to the longitudinal supporting structure by the upper surface.

In some embodiments, the techniques described herein are directed to a modular subbase, wherein the first lateral extending portion is configured to mount to the first coupling surface, and wherein the second lateral extending portion is configured to mount to the second coupling surface.

In some embodiments, the techniques described herein are directed to a modular subbase, wherein the modular subbase further includes a modular staircase configured to mount to the first lateral edge and/or the second lateral edge.

In some embodiments, the techniques described herein are directed to a modular subbase, wherein the longitudinal supporting structure and the upper surface further include one or more longitudinal reinforcing struts configured to provide resistance to lateral forces received by the longitudinal supporting structure.

In some embodiments, the techniques described herein are directed to a modular subbase, further comprising at least one first shim disposed on the first modular body compartment between a surface of the first modular body compartment and a first body mount, wherein the at least one first shim is tapered based on a draft angle of the first modular body compartment; and at least one second shim disposed on the second modular body compartment between a surface of the second modular body compartment and a second body mount, wherein the at least one second shim is tapered based on a draft angle of the first modular body compartment.

In some embodiments, the techniques described herein are directed to a modular subbase, wherein the first upwardly-facing arm and the second upwardly-facing arm provide resisting forces to deflection of the modular subbase.

In some embodiments, the techniques described herein are directed to a modular subbase, wherein the first upwardly-facing arm and the second upwardly-facing arm are coupled to the upper surface.

In some embodiments, the techniques described herein are directed to a modular subbase for mounting to a utility truck chassis, the modular subbase including: a longitudinal supporting structure configured to couple with the utility truck chassis, the longitudinal supporting structure including: a first upwardly-facing arm; a second upwardly-facing arm opposite the first upwardly-facing arm; a medial portion disposed between the first upwardly-facing arm and the second upwardly-facing arm; and an upper surface integrally coupled along a length of the longitudinal supporting structure, the upper surface including: a central portion configured to provide a walkable surface for a user; a first lateral edge extending beyond the longitudinal supporting structure, the first lateral edge having a first coupling surface; and a second lateral edge extending beyond the longitudinal supporting structure, the second lateral edge having a second coupling surface; and a first modular body compartment removably mounted to the upper surface, the first modular body compartment including: a first storage cavity configured to extend perpendicularly regarding the upper surface; and a first lateral extending portion configured to rest on the first lateral edge; and a second modular body compartment removably mounted to the upper surface, the second modular body compartment including: a second storage cavity configured to extend perpendicularly regarding the upper surface; and a second lateral extending portion configured to rest on the second lateral edge.

In some embodiments, the techniques described herein are directed to a modular subbase, wherein the first lateral extending portion is configured to mount to the first coupling surface, and wherein the second lateral extending portion is configured to mount to the second coupling surface.

In some embodiments, the techniques described herein are directed to a modular subbase, wherein the modular subbase further includes a modular staircase configured to mount to the first lateral edge and/or the second lateral edge.

In some embodiments, the techniques described herein are directed to a modular subbase, wherein the longitudinal supporting structure and the upper surface further include one or more longitudinal reinforcing struts configured to provide resistance to lateral forces along the longitudinal supporting structure.

In some embodiments, the techniques described herein are directed to a modular subbase, wherein the upper surface and the longitudinal supporting structure are integrated with a boom-arm pedestal.

In some embodiments, the techniques described herein are directed to a modular subbase, wherein the first upwardly-facing arm and the second upwardly-facing arm provide resisting forces to deflection of the modular subbase.

In some embodiments, the techniques described herein are directed to a modular subbase, wherein the first upwardly-facing arm and the second upwardly-facing arm are coupled to the upper surface.

In some embodiments, the techniques described herein are directed to a system for supporting one or more modular body compartments on a utility truck chassis, the system including: a modular subbase including: a longitudinal supporting structure configured to couple with the utility truck chassis, the longitudinal supporting structure including: a first upwardly-facing arm; a second upwardly-facing arm opposite the first upwardly-facing arm; and a medial portion disposed between the first upwardly-facing arm and the second upwardly-facing arm; and an upper surface integrally coupled along a length of the longitudinal supporting structure, the upper surface including: a central portion configured to provide a walkable surface for a user; a first lateral edge extending beyond a maximum width of the longitudinal supporting structure, the first lateral edge having a first coupling surface; and a second lateral edge extending beyond the longitudinal supporting structure, the second lateral edge having a second coupling surface.

In some embodiments, the techniques described herein are directed to a system, wherein the one or more modular body compartments include a modular staircase.

In some embodiments, the techniques described herein are directed to a system, wherein the one or more modular body compartments are removably mountable and configurable to be arranged with the modular subbase to compact the modular subbase for transport.

In some embodiments, the techniques described herein are directed to a system, wherein the modular subbase is configured to be bolted to the utility truck chassis.

In some embodiments, the techniques described herein are directed to a system, wherein the longitudinal supporting structure includes rounded edges to provide increased structural rigidity.

In some embodiments, the techniques described herein are directed to a system, wherein the first lateral edge and the second lateral edge each include a vertically descending portion configured to resist rotational forces applied by the one or more modular body compartments.

BRIEF DESCRIPTION OF THE DRAWING FIGURES

Embodiments of the present disclosure are described in detail below with reference to the attached drawing figures, wherein.

The drawing figures do not limit the present disclosure to the specific embodiments disclosed and described herein.

The drawings are not necessarily to scale, emphasis instead being placed upon clearly illustrating the principles of the present disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the present disclosure are directed to a modular subbase comprising a longitudinal support structure, a first modular body compartment, and a second modular body compartment. The longitudinal support structure is configured to support a boom arm pedestal, support one or more modular body compartments, and provide a walkable surface to a user. In some embodiments, the first modular body compartment and the second modular body compartment and the boom arm pedestal are coupled to an upper surface of the longitudinal support structure. The modular subbase may be coupled to a utility truck chassis.

System Overview

Figure 1A:
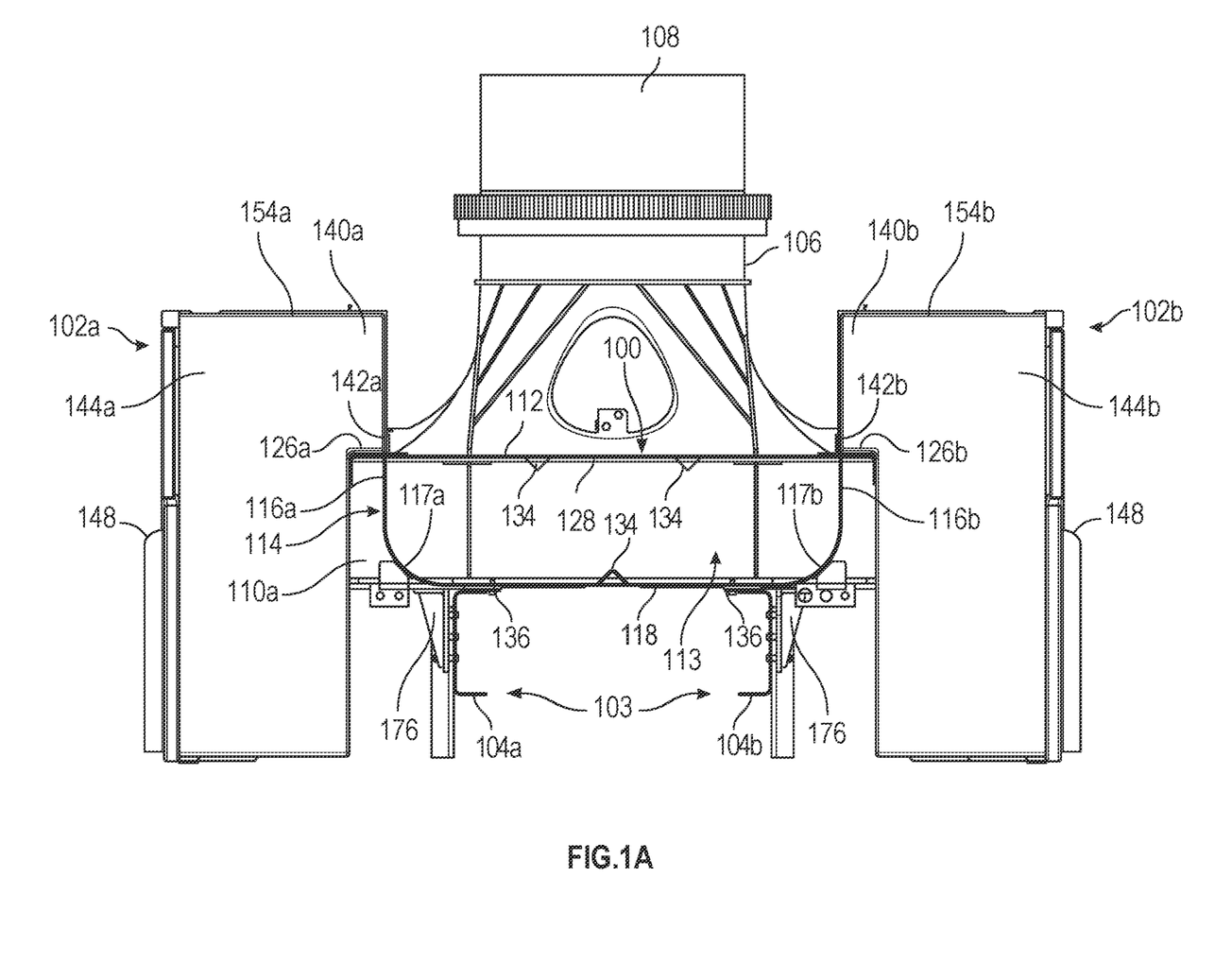
FIG. 1A illustrates a perspective cross-sectional view of a lightweight subbase mounted to a utility truck chassis for some embodiments.
Figure 1B:
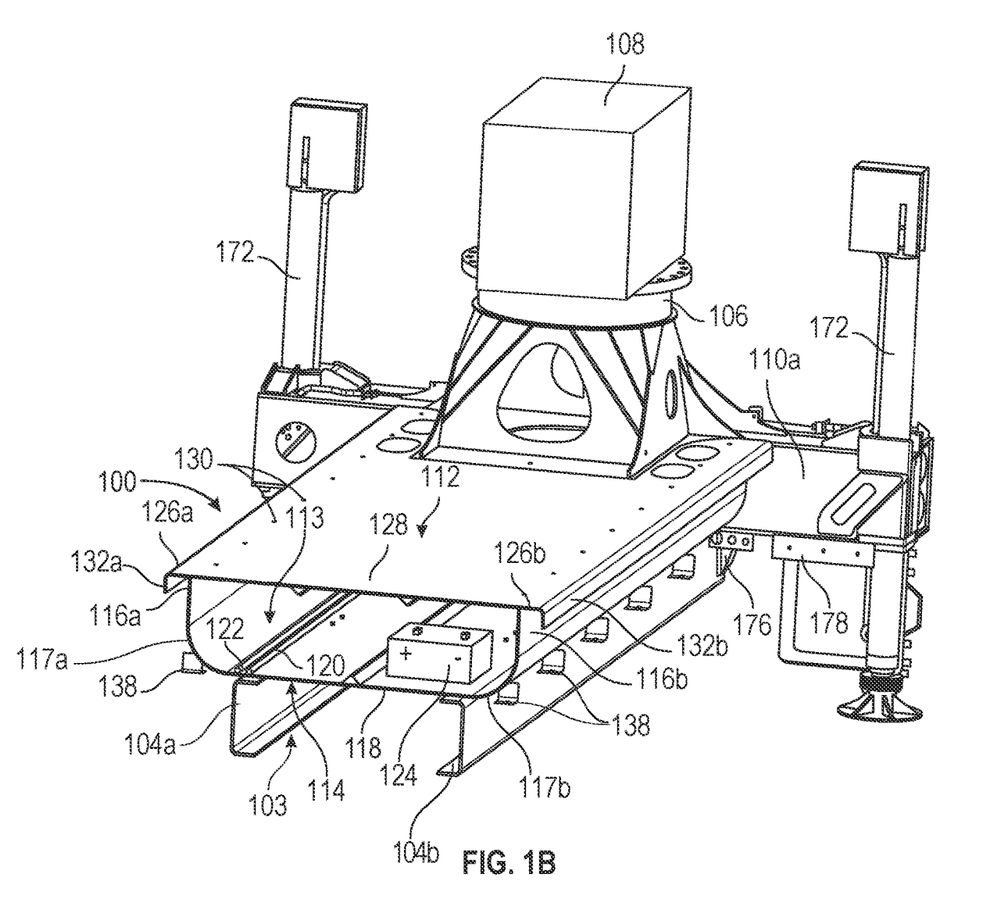
FIG. 1B illustrates a perspective view of a lightweight subbase mounted to a utility truck chassis for some embodiments.
Figure 1C:
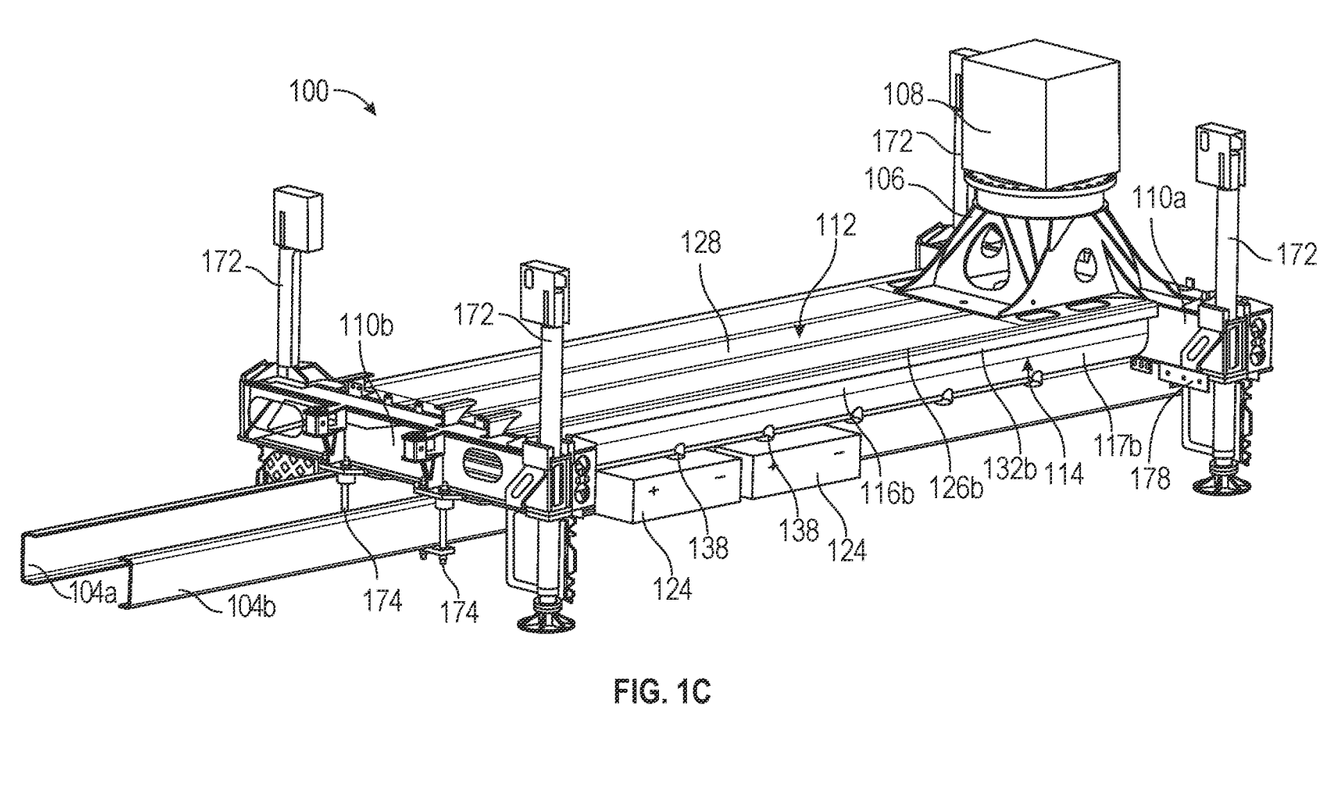
FIG. 1C illustrates a system for supporting modular bodies comprising a lightweight subbase coupled to a utility truck chassis for some embodiments.
Figure 1D:
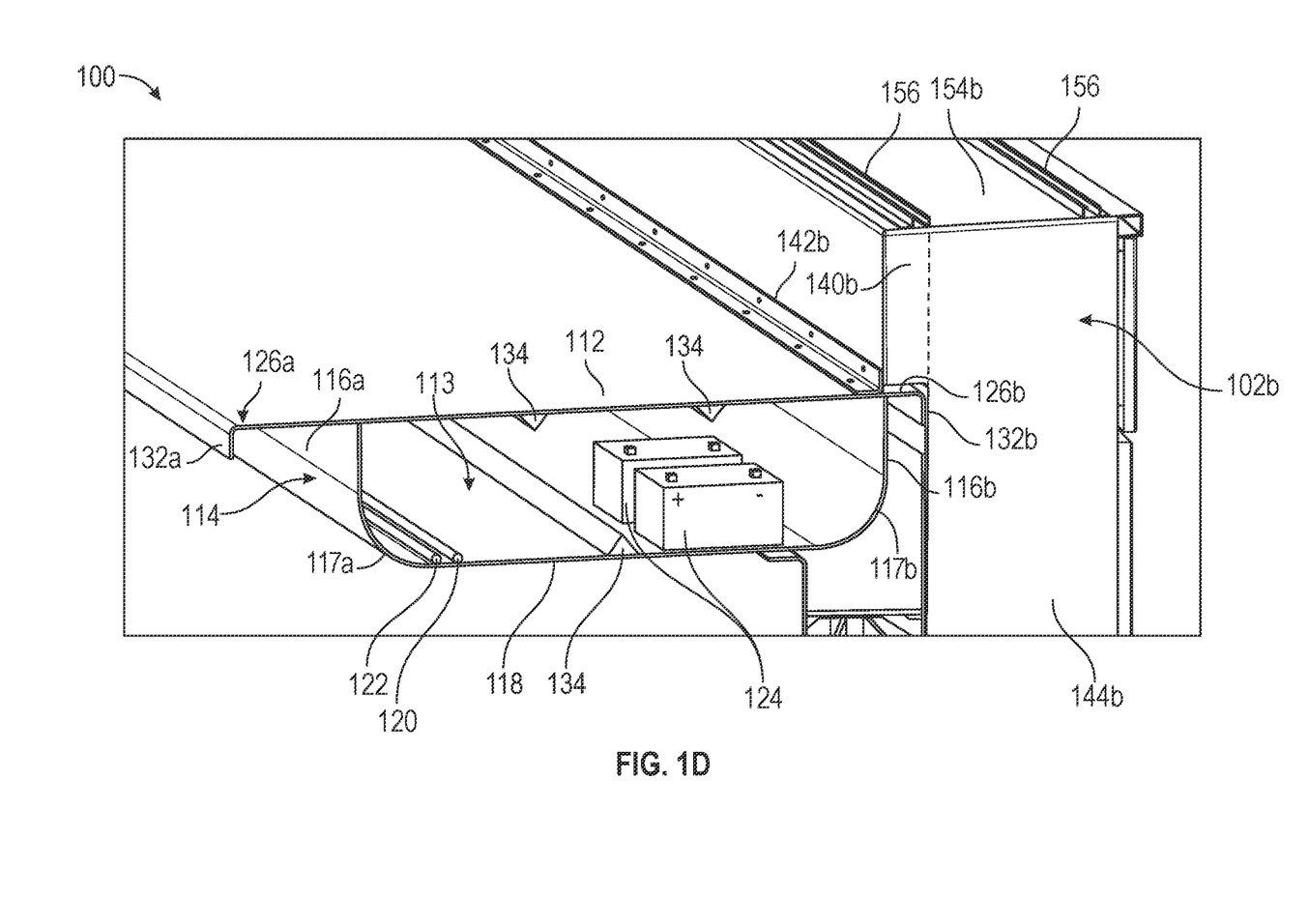
FIG. 1D illustrates a modular body coupled to a lightweight chassis for some embodiments.
Figure 1E:
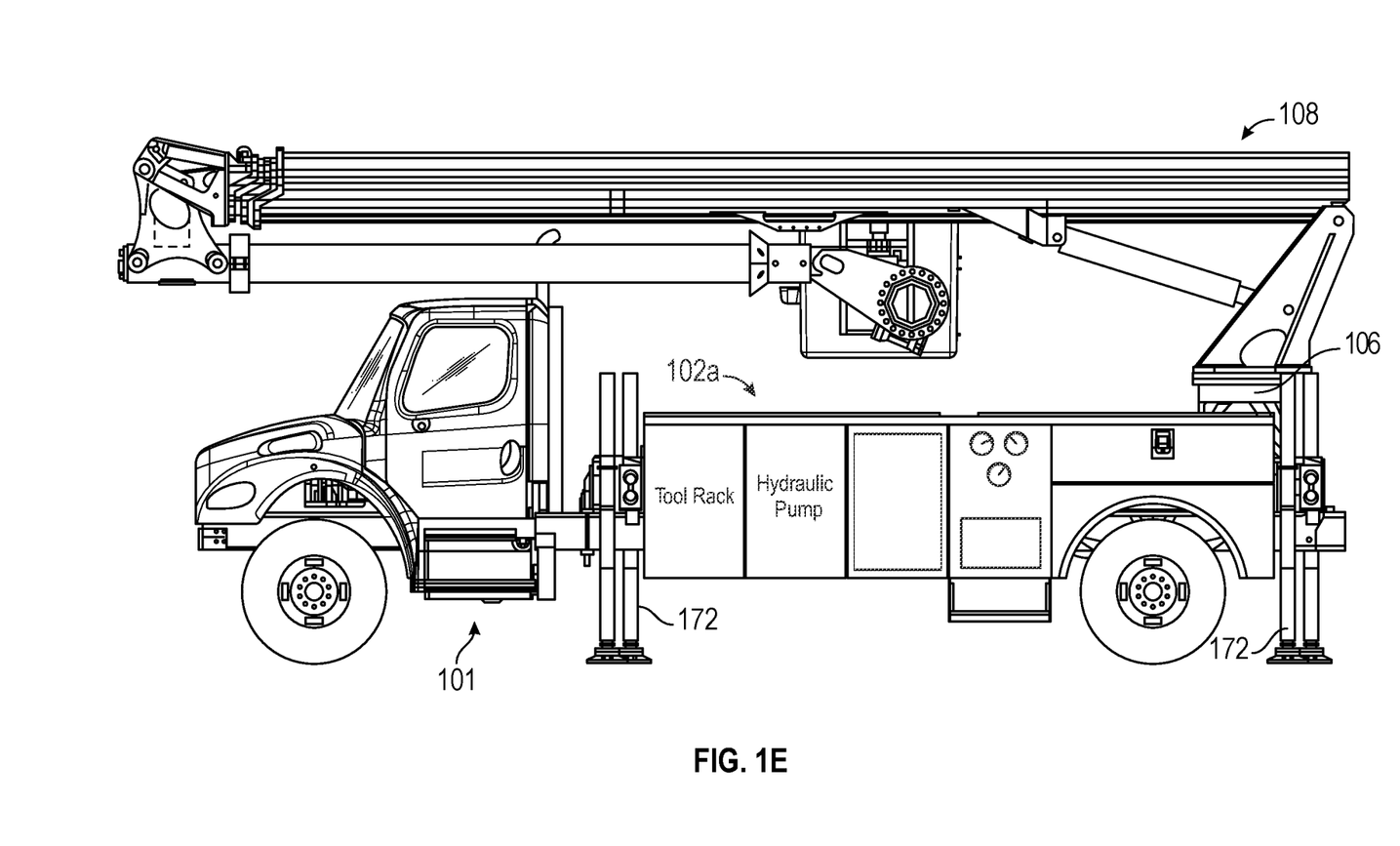
FIG. 1E illustrates a wide-angle view of a lightweight subbase and modular bodies mounted to a utility truck for some embodiments.

FIGS. 1A-1E illustrate a lightweight subbase 100 for coupling to a truck chassis 103 of a utility truck. The truck chassis 103 carries the lightweight subbase 100 of embodiments of the present disclosure, a utility truck 101 (as depicted in FIG. 1E) (e.g., known truck components such as truck body, engine, etc.), and one or more components specific to the utility truck, such as a boom or outriggers and as discussed further below. In embodiments, the truck chassis 103 comprises two or more rails 104a, 104b extending along at least a portion of a length of the utility truck, as shown in FIGS. 1B-1C. In the drawings, the chassis rails 104a, 104b are I-beams made of steel or other suitable material for supporting the weight of the utility truck components.

In embodiments, one or more components are couplable to lightweight subbase 100. For example, as shown in FIG. 1A, at least one modular body, such as first modular body 102a and second modular body 102b, is coupled to the subbase 100. As shown in FIG. 1B, a boom-arm pedestal 106 is mounted on and coupled to the subbase 100. In some embodiments, boom-arm pedestal 106 supports and operates a boom-arm 108. As shown in FIGS. 1A-1C, a first outrigger box 110a and a second outrigger box 110b are coupled to the subbase 100. In some embodiments, lightweight subbase 100 may be coupled to chassis 103 by first outrigger box 110a and second outrigger box 110b. First modular body 102a and second modular body 102b may be coupled to first outrigger box 110a and/or second outrigger box 110b.

As best shown in FIG. 1B, lightweight subbase 100 comprises an upper surface 112 and a longitudinal supporting structure 114. Lightweight subbase 100 is configured to provide structural support and a mounting surface for the various utility truck components, including modular bodies 102a, 102b, boom-arm pedestal 106, and outrigger boxes 110a, 110b. Structural support of components coupled to lightweight subbase 100, either directly or indirectly, is achieved by integrating or fastening the upper surface 112 and the longitudinal supporting structure 114 together. In some embodiments, upper surface 112, longitudinal supporting structure 114, and lightweight subbase 100 are monolithic.

As illustrated in FIG. 1A-1C, Boom-arm pedestal 106 may be coupled to upper surface 112. In some embodiments, boom-arm pedestal 106 may be integrated into upper surface 112 such that boom-arm pedestal 106 and upper surface 112 are monolithic. In some embodiments, boom-arm pedestal 106 may be welded directly to upper surface 112. Boom-arm pedestal 106 may be coupled to upper surface 112 and first outrigger box 110a. In some embodiments, boom-arm pedestal 106 is coupled to first outrigger box 110a and/or second outrigger box 110b. Boom-arm pedestal 106 may support and operate a boom-arm 108. In some embodiments, boom-arm pedestal 106, upper surface 112, and lightweight subbase 100 may be integrally connected to form lightweight subbase 100. In some embodiments, boom-arm pedestal 106 is absent.

Referring to FIG. 1E, utility truck 101 is depicted with lightweight subbase 100 and modular bodies 102a, 102b coupled. Utility truck 101 comprises utility truck chassis 103 and chassis rails 104a, 104b. In some embodiments, utility truck 101 is configured to be an electric vehicle driven by electric motors receiving power from a variety of power sources. For example, utility truck 101 may power the motors from internal battery banks (not shown), batteries 124 stored within lightweight subbase 100, a diesel engine (e.g., the engine of utility truck 101), and/or any other such method of providing electric power or any combination thereof.

Lightweight Subbase

As discussed above, lightweight subbase 100 comprises upper surface 112 and longitudinal supporting structure 114. Lightweight subbase 100 is configured to be structurally supportive for the utility truck components while reducing weight over current subbase implementations and allowing for modular deployment and shipping of the subbase and mountable components. The increased structural support provided by the subbase is achieved, at least in part, due to the integrated, monolithic upper surface 112 and longitudinal supporting structure 114. As described in the Background, traditional subbases use heavy supporting structures to permanently couple bodies (e.g., modular body 102a and modular body 102b) together. In contrast, lightweight subbase 100 provides structural support and a connection to chassis 103 without permanently coupling first modular body 102a and second modular body 102b together. Further, lightweight subbase 100 provides structural rigidity without using reinforcing structures separate from longitudinal supporting structure 114. For example, first upwardly-facing arm 116a and second upwardly-facing arm 116b are structurally rigid without using reinforcing beams such as I-beams or vertical supporting plates.

First upwardly-facing arm 116a and second upwardly-facing arm 116b allow for reduction of weight of lightweight subbase 100. For example, the structural rigidity of longitudinal supporting structure 114 allows lightweight subbase 100 to be constructed from plate metal that is about ⅜ inch thick thereby reducing weight of the structure through using thinner plate metal than a thicker plate (e.g., ⅝ inch, ½ inch, ¾ inch, etc.). Further, using semi-circular designs (as previously discussed) obviates using steel beams, which increase weight of the structure.

Lightweight subbase 100 is substantially hollow to present a channel 113 therethrough. For example, upper surface 112 and longitudinal supporting structure 114 may be perimetric structures around channel 113. The hollowed channel 113 of lightweight subbase 100 allows cables 120 and/or hydraulic line 122 to run through lightweight subbase 100 without exposure to environmental factors (e.g., rain, snow, sun, wind, gravel, dust, etc.). Further, hydraulic lines used to control boom-arm pedestal 106 or the boom-arm 108 attached thereto may be run through lightweight subbase 100 to prevent exposure to the environmental factors discussed previously. Furthermore, lightweight subbase 100 may be configured to store batteries 124 within channel 113. Storing batteries 124 within channel 113 prevents exposure to environmental factors. For example, lightweight subbase 100 provides a covered environment isolated from rain, snow, and wind, which prevents water damage or electrical shorts caused by water exposure. In some embodiments, batteries 124 may be mounted underneath lightweight subbase 100 and/or longitudinal supporting structure 114.

Longitudinal Supporting Structure

Referring again to FIG. 1D, longitudinal supporting structure 114 is generally U-shaped and comprises a first upwardly-facing arm 116a having an arcuate trailing edge 117a, a second upwardly-facing arm 116b also having an arcuate trailing edge 117b, and a medial section 118 disposed between the trailing edges 117a, 117b of the first and second arms 116a, 116b, such that the first and second arms 116a, 116b and the medial section 118 comprise a monolithic unit. First and second upwardly-facing arms 116a, 116b with respective arcuate trailing edges 117a, 117b are configured to structurally support upper surface 112 via employing the arcuate trailing edges 117a, 117b.

Applicant has found that the arcuate trailing edges 117a, 117b provide improved structural rigidity than right-angle connection joints between the first and second arms 116a, 116b and the medial section 118. Use of the arcuate trailing edges 117a, 117b to join the upwardly-facing arms 116a, 116b to the medial section 118 distributes load substantially evenly along the arcuate trailing edges 117a, 117b to thereby avoid portions of the longitudinal supporting structure 114 receiving more stress than other portions. In embodiments, the arcuate trailing edges 117a, 117b have a radius of curvature of about one half of a distance between a top plate and a bottom plate of the subbase 100. In some embodiments, arcuate trailing edges 117a, 117b have a radius of curvature within a range of 1° to 90°, 90° to 180°, 180° to 270°, or 270° to 360°. It is contemplated that arcuate trailing edges 117a, 117b may have a radius of curvature of any angle without departing from the scope of the present disclosure. Further, it is contemplated that arcuate trailing edge 117a may have a different radius of curvature from arcuate trailing edge 117b. Thus, the arcuate design of the longitudinal supporting structure 114 provides increased structural support for boom-arm pedestal 106 and other components mounted to or supported by subbase 100.

In some embodiments, a cross-section of the longitudinal supporting structure 114 may be optimized by maximizing the area of the cross-section while minimizing the perimeter of the cross-section. Further, in some embodiments, as the fabrication complexity for providing the longitudinal supporting structure 114 increases, the torsional stiffness generally increases. For example, additional complexity in the geometry of the longitudinal supporting structure 114, such as curved edges and protrusions provide additional torsional stiffness by introducing added structural reinforcement. In particular, the curved edges contemplated for the articulate trailing edges 117a and 117b provide a more even distribution of load when compared to a sharp a 90° angle edge and therefore, increase the torsional stiffness of the overall longitudinal supporting structure 114.

In some embodiments, longitudinal supporting structure 114 comprises first upwardly-facing arm 116a, second upwardly-facing arm 116b, and medial section 118 disposed therebetween. In some embodiments, first upwardly-facing arm 116a, second upwardly-facing arm 116b and medial section 118 are discrete elements of longitudinal supporting structure 114. In some embodiments, first upwardly-facing arm 116a and second upwardly-facing arm 116b comprise arcuate trailing edges 117a and 117b. In some embodiments, each of the elements of longitudinal supporting structure 114 form a unitary body and are not discrete elements. Lightweight subbase 100 may comprise upper surface 112 coupled to longitudinal supporting structure 114. In some embodiments, upper surface 112 is coupled along at least a portion of longitudinal supporting structure 114. For example, upper surface 112 may be coupled along at least 50% of longitudinal supporting structure 114, along at least 75% of longitudinal supporting structure 114, along at least 90% of longitudinal supporting structure 114, or along any length of longitudinal supporting structure 114. It is contemplated that upper surface 112 may be coupled along any length of any portion of longitudinal supporting structure 114 without departing from the scope of the present disclosure. Longitudinal supporting structure 114 may be a discrete component of lightweight subbase 100. In some embodiments, longitudinal supporting structure 114 and lightweight subbase 100 are separate structures coupled together. In some embodiments, longitudinal supporting structure 114 may replace lightweight subbase 100 and boom-arm pedestal 106 may be coupled directly to longitudinal supporting structure 114. For example, boom-arm pedestal 106 may be coupled directly to first upwardly-facing arm 116a and second upwardly-facing arm 116b for structural support.

In some embodiments, first upwardly-facing arm 116a and second upwardly-facing arm 116b are configured to extend upwards from medial section 118. In some embodiments, arcuate trailing edges 117a and 117b of upwardly-facing arms 116a, 116b follow a 90° arc. The arc of arcuate trailing edges 117a and 117b provide structural support due to the equal distribution of load throughout the curve of arcuate trailing edges 117a and 117b. The equal distribution of load of first upwardly-facing arm 116a and second upwardly-facing arm 116b allow lightweight subbase 100 to provide structural support while reducing weight without an increase in size when compared to current subbase and body structures. In some embodiments, first upwardly-facing arm 116a and second upwardly-facing arm 116b comprise steel, titanium, aluminum, cast iron, polycarbonate, carbon fiber, or any other such structurally rigid material. In some embodiments, lightweight subbase 100 is configured to accommodate for the weight of an electric vehicle (EV) chassis and/or configured to accommodate the weight of batteries 124 when used for conversion of a standard chassis to an electric vehicle (EV) chassis.

Longitudinal supporting structure 114 comprises medial section 118 disposed between first upwardly-facing arm 116a and second upwardly-facing arm 116b. In some embodiments, first upwardly-facing arm 116a transitions into medial section 118, which in turn transitions into second upwardly-facing arm 116b. In some embodiments, first upwardly-facing arm 116a and second upwardly-facing arm 116b extend upwards from medial section 118 disposed therebetween. In some embodiments, first upwardly-facing arm 116a, second upwardly-facing arm 116b, and medial section 118 are discrete elements that form longitudinal supporting structure 114. In some embodiments, first upwardly-facing arm 116a, second upwardly-facing arm 116b, and medial section 118 are a unitary structure that forms longitudinal supporting structure 114.

In some embodiments, medial section 118 is configured to provide lateral support to first upwardly-facing arm 116a and second upwardly-facing arm 116b. For example, a lateral force applied to first upwardly-facing arm 116a and second upwardly-facing arm 116b may cause either first upwardly-facing arm 116a or second upwardly-facing arm 116b to bend. However, medial section 118 is placed between first upwardly-facing arm 116a and second upwardly-facing arm 116b such that medial section 118 braces first upwardly-facing arm 116a and second upwardly-facing arm 116b to prevent bending of first upwardly-facing arm 116a and second upwardly-facing arm 116b. Furthermore, torsional forces caused by movement of boom-arm pedestal 106 or caused by loads placed upon upper surface 112 may cause lateral inward bending of first upwardly-facing arm 116a and second upwardly-facing arm 116b. Medial section 118 is configured to prevent lateral bending and prevents lateral inward bending and lateral outward bending of first upwardly-facing arm 116a and second upwardly-facing arm 116b.

Lightweight subbase 100 comprises upper surface 112. In some embodiments, upper surface 112 is integrally coupled to longitudinal supporting structure 114. In some embodiments, lightweight subbase 100 comprises upper surface 112 and longitudinal supporting structure 114 coupled together. In some embodiments, lightweight subbase 100 is monolithic. Upper surface 112 may be disposed along a length of longitudinal supporting structure 114. In some embodiments, upper surface 112 may extend along the entire length of longitudinal supporting structure 114. Upper surface 112 comprises a metal material such as steel, aluminum, titanium, or any other such metal. In some embodiments, upper surface 112 is configured to provide a walkable surface for a user. For example, upper surface 112 may comprise a gripped surface such as rubber, diamond plate, ridges, or any other such gripped surface to provide a non-slip walkable surface for the user.

In some embodiments, upper surface 112 is superimposed upon longitudinal supporting structure 114 to form lightweight subbase 100. For example, first upwardly-facing arm 116a and second upwardly-facing arm 116b of longitudinal supporting structure 114 may be coupled to upper surface 112 in a longitudinal direction. Furthermore, upper surface 112 may be positioned flatly on top of longitudinal supporting structure 114 such that upper surface 112 is an upper surface of lightweight subbase 100. In some embodiments, upper surface 112 is configured to extend beyond longitudinal supporting structure 114.

In some embodiments, upper surface 112 comprises a first lateral edge 126a, a second lateral edge 126b, and a central portion 128 disposed therebetween. Central portion 128 may be configured to have a maximum width equal to the width of longitudinal supporting structure 114. Furthermore, first lateral edge 126a and second lateral edge 126b may be configured to extend laterally beyond the maximum width of central portion 128 and/or longitudinal supporting structure 114 such that first lateral edge 126a and second lateral edge 126b, and therefore upper surface 112, have a maximum width greater than longitudinal supporting structure 114. In some embodiments, central portion 128 is bounded by first upwardly-facing arm 116a and second upwardly-facing arm 116b. In some embodiments, first lateral edge 126a is opposite second lateral edge 126b. First lateral edge 126a and second lateral edge 126b may be configured to provide structural support to first modular body 102a and second modular body 102b respectively. Particularly, first lateral edge 126a and second lateral edge 126b extend laterally from central portion 128 to provide a resting surface for first modular body 102a and/or second modular body 102b. In some embodiments, either first lateral edge 126a or second lateral edge 126b may support first modular body 102a and/or second modular body 102b or any combination thereof. In some embodiments, first lateral edge 126a supports first modular body 102a and second lateral edge 126b supports second modular body 102b or any arrangement thereof.

In some embodiments, first lateral edge 126a and second lateral edge 126b each comprise threaded holes 130. In some embodiments, threaded holes 130 are placed periodically along first lateral edge 126a and second lateral edge 126b. In some embodiments, threaded holes 130 are evenly spaced to accommodate first modular body 102a and second modular body 102b. In some embodiments, threaded holes 130 are configured to allow for mounting a plurality of modular bodies such as first modular body 102a and second modular body 102b to upper surface 112.

First lateral edge 126a comprises a first vertical portion 132a and second lateral edge 126b comprises second vertical portion 132b. First vertical portion 132a descends vertically from first lateral edge 126a. Second vertical portion 132b descends vertically from second lateral edge 126b. In some embodiments, first lateral edge 126a comprises second vertical portion 132b and second lateral edge 126b comprises first vertical portion 132a. In some embodiments, first vertical portion 132a and/or second vertical portion 132b descend vertically from first lateral edge 126a and/or second lateral edge 126b. In some embodiments, first lateral edge 126a and second lateral edge 126b are configured to prevent rotation of first modular body 102a and/or second modular body 102b towards lightweight subbase 100. For example, first vertical portion 132a and second vertical portion 132b may be configured to prevent lateral inward bending of first modular body 102a and second modular body 102b by providing a resisting force to lateral forces applied to first modular body 102a and/or second modular body 102b.

In some embodiments, first lateral edge 126a and second lateral edge 126b may be rounded to increase structural rigidity similar to first upwardly-facing arm 116a and second upwardly-facing arm 116b. For example, first lateral edge 126a may bend vertically to form first vertical portion 132a. The bend may form a 90° arc thereby providing structural rigidity due to the equal distribution of load throughout the arc. In some embodiments, the bend may form an arc ranging from 1° to 360°. The structural rigidity may increase resistance to laterally and vertically applied loads such as moment applied by rotation of first modular body 102a or second modular body 102b.

In some embodiments, lightweight subbase 100 and/or longitudinal supporting structure 114 comprise longitudinal struts 134. Longitudinal struts 134 may be disposed longitudinally along medial section 118 and upper surface 112. In some embodiments, longitudinal struts 134 may be configured to prevent buckling of upper surface 112 and medial section 118 caused by lateral forces applied to upper surface 112 and/or longitudinal supporting structure 114. In some embodiments, longitudinal struts 134 may comprise V-shaped structures forming a triangular structure with upper surface 112 and medial section 118. The longitudinal struts 134 provide resistance to lateral forces by reinforcing medial section 118 and upper surface 112 in the lateral direction.

In some embodiments, medial section 118 and upper surface 112 each comprise longitudinal struts 134 configured to prevent buckling of medial section 118 and upper surface 112 in response to lateral forces enacted on either medial section 118 or upper surface 112. In some embodiments, longitudinal struts 134 comprises two metal strips forming a V-shaped ridge extending longitudinally along a length of lightweight subbase 100. For example, longitudinal struts 134 may comprise long metal strips bent to form a 90° angle such that the entire length of longitudinal struts 134 forms a 90° angle. Alternatively, longitudinal struts 134 may comprise two metal strips welded lengthwise at a 90° angle to form the V-shaped structure previously discussed. Additionally, or in the alternative, in some embodiments, the longitudinal struts 134 may comprise other suitable angles besides a 90° angle. For example, the longitudinal struts 134 may include an acute angle or obtuse angle. However, it should be understood that the effectiveness of increasing structural rigidity may decrease as the angle becomes more obtuse. Further, in some embodiments, the longitudinal struts 134 may comprises a vertical plane. Further still, embodiments are contemplated in which the longitudinal struts 134 comprise one or more curved edges.

In some embodiments, longitudinal struts 134 are configured to provide additional structural support longitudinally throughout lightweight subbase 100 and longitudinal supporting structure 114. For example, longitudinal struts 134 may be integrated into lightweight subbase 100 thereby increasing resistance to buckling laterally (as previously discussed) and buckling longitudinally. This is achieved by longitudinal struts 134 extending along the entire length of lightweight subbase 100 and coupling to first outrigger box 110a and second outrigger box 110b. This braces lightweight subbase 100 between first outrigger box 110a and second outrigger box 110b such that, if compressive forces are applied to first outrigger box 110a and second outrigger box 110b in the longitudinal direction, longitudinal struts 134 provides a resisting force to the compressive forces applied to first outrigger box 110a and second outrigger box 110b.

In some embodiments, lightweight subbase 100 comprises skid plates 136 between longitudinal supporting structure 114 and chassis 103. In some embodiments, lightweight subbase 100 is configured to slide along chassis 103 via skid plates 136. In some embodiments, skid plates 136 are disposed between longitudinal supporting structure 114 and chassis 103. Specifically, skid plates 136 may be disposed between medial section 118 and chassis 103. Skid plates 136 prevent damage to medial section 118 and/or first upwardly-facing arm 116a and second upwardly-facing arm 116b caused by repeatedly contacting chassis 103. For example, the skid plates may be configured to provide a low friction coupling between the longitudinal supporting structure 114 and the chassis 103. In some embodiments, skid plates 136 comprise a metal such as steel, titanium, aluminum, or any other such metal. In some embodiments, skid plates 136 may be coated in oil to prevent grinding between lightweight subbase 100 and chassis 103. Additionally, non-metallic materials are also contemplated for the skid plates 136 such as nylon or Delrin acetal homopolymer (Delrin), as well as other suitable low-friction non-metallic materials. Skid plates 136 may be mounted to lightweight subbase 100 and/or chassis 103.

In some embodiments, longitudinal supporting structure 114 comprises a plurality of coupling points 138 disposed along first upwardly-facing arm 116a and/or second upwardly-facing arm 116b. In some embodiments, plurality of coupling points 138 is disposed along medial section 118 or any other element of longitudinal supporting structure 114. Plurality of coupling points 138 may be used to fasten batteries 124 outside of longitudinal supporting structure 114. Plurality of coupling points 138 may be configured to provide additional mounting points between longitudinal supporting structure 114 and chassis 103. In some embodiments, plurality of coupling points 138 are configured to couple cables 120 and hydraulic line 122 outside of lightweight subbase 100. For example, cables 120 and hydraulic line 122 may be run along the exterior of longitudinal supporting structure 114 coupled to one or more of plurality of coupling points 138 such that cables 120 and hydraulic line 122 do not detach from the vehicle during transit or operation.

Modular Bodies

Figure 2A:
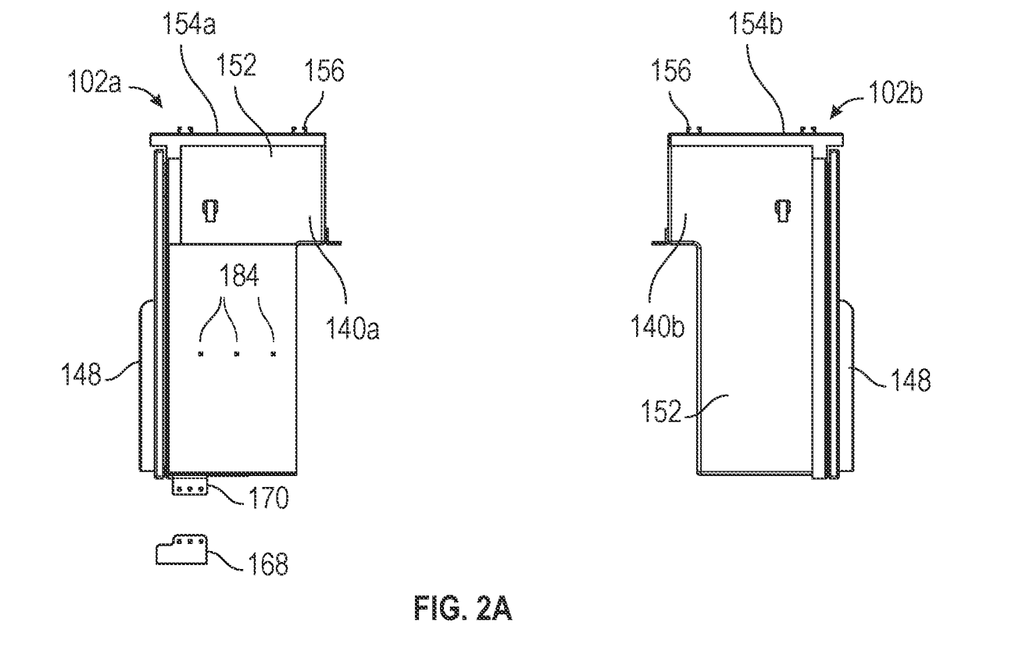
FIG. 2A illustrates a front view of a first modular body and second modular body for some embodiments.
Figure 2B:
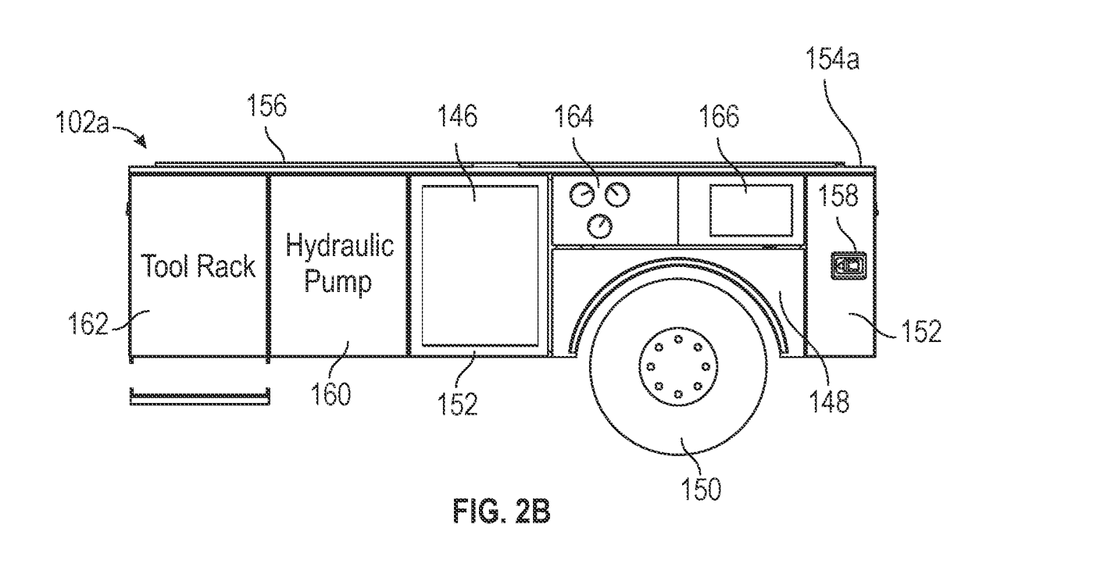
FIG. 2B illustrates a side view of a modular body for some embodiments.

FIGS. 2A and 2B illustrate a first modular body 102a and a second modular body 102b for mounting to lightweight subbase 100 for some embodiments. First modular body 102a and second modular body 102b may be substantially identical but mirrored. First modular body 102a and second modular body 102b are configured to be mounted to lightweight subbase 100. In some embodiments, first modular body 102a and second modular body 102b are each configured to accommodate vehicle tire 150. In some embodiments, first modular body 102a and second modular body 102b are configured to mount between first outrigger box 110a and second outrigger box 110b.

In some embodiments, first modular body 102a and second modular body 102b are configured to rest on first lateral edge 126a and second lateral edge 126b. In order to achieve this, first modular body 102a and second modular body 102b comprise first lateral portion 140a and second lateral portion 140b respectively. In some embodiments, first lateral portion 140a and second lateral portion 140b are bolted to upper surface 112 via first mounting bracket 142a and second mounting bracket 142b respectively. In some embodiments, first lateral portion 140a and second lateral portion 140b extend laterally from a first body portion 144a and a second body portion 144b respectively.

First modular body 102a and second modular body 102b are configured to be removably mounted to longitudinal supporting structure 114. For example, first modular body 102a and second modular body 102b may be coupled to first lateral edge 126a and second lateral edge 126b using bolts and may, at any time, be uncoupled and removed from longitudinal supporting structure 114. Similarly, first modular body 102a and second modular body 102b may each be configured to be arranged with longitudinal supporting structure 114 for shipping and/or transport. For example, first modular body 102a and second modular body 102b may be removed from longitudinal supporting structure 114 and arranged with longitudinal supporting structure 114 to compact first modular body 102a, second modular body 102b, and longitudinal supporting structure 114.

In some embodiments, removably mounting first modular body 102a and second modular body 102b to longitudinal supporting structure 114 allows for swapping first modular body 102a and second modular body 102b with other modular bodies. In some embodiments, first modular body 102a and second modular body 102b may be swapped with each other. Removably mounting first modular body 102a and second modular body 102b to longitudinal supporting structure 114 and/or lightweight subbase 100 allows first modular body 102a and second modular body 102b to be removed and repaired if repair is needed. Furthermore, if repair of first modular body 102a and/or second modular body 102b is uneconomical and/or impossible, first modular body 102a and second modular body 102b may each be replaced for an identical modular body. In some embodiments, first modular body 102a and second modular body 102b may be swapped out for modular bodies containing alternative tools. For example, first modular body 102a may be configured to hold tools while an identical swappable replacement for first modular body 102a may be configured to provide operational controls for boom-arm 108.

First modular body 102a and second modular body 102b comprise a first body portion 144a and second body portion 144b respectively. First body portion 144a and/or second body portion 144b may comprise storage cavity 146 for storing items such as tools, clothing, safety gear, cable, or any other such item. In some embodiments, first body portion 144a and/or second body portion 144b may each comprise a wheel-well 148 for accommodating a vehicle tire 150. In some embodiments, first body portion 144a and/or second body portion 144b comprises one or more compartments 152.

In some embodiments, first body portion 144a and second body portion 144b extend perpendicularly regarding upper surface 112. For example, first modular body 102a and second modular body 102b are mounted to first lateral edge 126a and second lateral edge 126b respectively. As such, first body portion 144a and second body portion 144b extend vertically regarding upper surface 112, which extends horizontally (i.e., laterally). In some embodiments, upper surface 112 may extend vertically and first body portion 144a and second body portion 144b may extend horizontally, maintaining the perpendicular nature of first body portion 144a and second body portion 144b regarding upper surface 112.

First modular body 102a may be mounted to first lateral edge 126a by a first mounting bracket 142a. Similarly, second modular body 102b may be mounted to second lateral edge 126b using a second mounting bracket 142b. In some embodiments, first mounting bracket 142a and second mounting bracket 142b are mounted to upper surface 112. First mounting bracket 142a and second mounting bracket 142b may mount first modular body 102a and second modular body 102b using mounting hardware such as bolts, welds, adhesive, clamps, or any other such mounting hardware.

In some embodiments, first modular body 102a and second modular body 102b comprise a first lateral portion 140a and a second lateral portion 140b respectively. First modular body 102a is configured to rest upon first lateral edge 126a via first lateral portion 140a and/or second modular body 102b is configured to rest upon second lateral edge 126b via second lateral portion 140b. Further, first modular body 102a is configured to mount to first lateral edge 126a and/or upper surface 112 using first mounting bracket 142a and second modular body 102b is configured to mount to second lateral edge 126b and/or upper surface 112 using second mounting bracket 142b. In some embodiments, first mounting bracket 142a and/or second mounting bracket 142b are connected to first lateral edge 126a and/or second lateral edge 126b via a mounting mechanism such as bolts, clamps, adhesive, welds, interlocking plates, and/or any other such mounting mechanism.

In some embodiments, first lateral portion 140a and second lateral portion 140b are each configured to removably mount to first lateral edge 126a and second lateral edge 126b respectively. This is done to allow first modular body 102a and second modular body 102b to be removed from longitudinal supporting structure 114. First mounting bracket 142a and second mounting bracket 142b may accommodate removably mounting first lateral portion 140a and second lateral portion 140b respectively. In some embodiments, first mounting bracket 142a may be removed with first modular body 102a and/or second mounting bracket 142b may be removed with second modular body 102b.

First modular body 102a and second modular body 102b may comprise first top surface 154a and second top surface 154b respectively. In some embodiments, each of first top surface 154a and second top surface 154b may comprise mounting rails 156 configured to slidably couple objects such as tools, backpacks, additional compartments, generators, robotically enhanced tools, and/or any other such object. For example, a backpack (not shown) may be configured to mount to mounting rails 156 using a slide inserted into mounting rails 156. Thus, any object may be slidably mounted to mounting rails 156.

Further, first top surface 154a and/or second top surface 154b may be standing surfaces for a user. For example, first top surface 154a and second top surface 154b each may comprise a railing (not shown) such that a user has a grip while standing on first top surface 154a or second top surface 154b. In some embodiments, first top surface 154a and/or second top surface 154b comprise a walkable surface similar to upper surface 112. For example, first top surface 154a may comprise diamond plate and second top surface 154b may comprise a studded rubber surface. It is contemplated that first top surface 154a and/or second top surface 154b may comprise any material and/or any combination of materials without departing from the scope of the present disclosure.

In some embodiments, first modular body 102a and second modular body 102b comprise a plurality of compartments 152. In some embodiments, compartments 152 comprise a range of different shapes and sizes, such as cylindrical, rectangular, circular, non-uniform shapes, or any other such shape. Compartments 152 may be arranged longitudinally along each of first modular body 102a and second modular body 102b. Compartments 152 open into storage cavity 146 to allow for storing of items and materials as discussed above. In some embodiments, each of compartments 152 are separated inside of storage cavity 146. In some embodiments, storage cavity 146 is a single open cavity within first body portion 144a and each of compartments 152 open into storage cavity 146. Each compartment may comprise a compartment latch 158. Compartment latch 158 may comprise a latching mechanism such as a cam latch, draw latch, push to close latch or any other such latch.

In some embodiments, lightweight subbase 100 is configured to couple to multiple modular bodies (i.e., first modular body 102a, second modular body 102b, and others not shown). For example, lightweight subbase 100 comprises threaded holes 130 for providing mounting positions for the modular bodies (e.g., first modular body 102a and second modular body 102b). In some embodiments, first modular body 102a and second modular body 102b may be a plurality of separated modular bodies serving similar or distinct functions. In some embodiments, compartments 152 may comprise a hydraulic pump 160 configured to provide hydraulic pressure to boom-arm 108 and boom-arm pedestal 106. In some embodiments, compartments 152 comprise tool rack 162 configured to hold tools and provide access to tools without obstruction. In some embodiments, one or more of compartments 152 may comprise a gauge cluster 164 and/or a screen 166. In some embodiments, screen 166 displays information related to hydraulic pressure supplied by hydraulic pump 160. In some embodiments, gauge cluster 164 displays hydraulic pressure supplied by hydraulic pump 160, tire pressure of vehicle tire 150, voltage level of batteries 124, fuel level, or any other such information. In some embodiments, screen 166 is a touch screen and is configured to provide operational controls for boom-arm 108.

In some embodiments, first modular body 102a and/or second modular body 102b comprise a mountable staircase 168. Mountable staircase 168 may be configured to bolt onto mounting surface 170 of first modular body 102a. Mountable staircase 168 may allow a user to gain access to compartments 152. In some embodiments, mountable staircase 168 allows a user to climb unto upper surface 112 or first modular body 102a. In some embodiments, mounting surface 170 is disposed below one or more of compartments 152 and mountable staircase 168 is coupled to mounting surface 170. In some embodiments, mountable staircase 168 comprises multiple steps. Mountable staircase 168 may replace one or more compartments 152 in first modular body 102a and/or second modular body 102b. In some embodiments, mountable staircase 168 may be removably mounted to first modular body 102a and/or second modular body 102b.

Outrigger Boxes

Referring again to FIGS. 1B and 1C, first outrigger box 110a and second outrigger box 110b comprise one or more hydraulic pistons 172 configured to prevent the utility truck (not shown) from tipping during operation of boom-arm 108. One or more hydraulic pistons 172 may extend laterally from first outrigger box 110a and second outrigger box 110b to provide a wide base of support to aid in prevention of tipping. In some embodiments, this is achieved by extending the hydraulic pistons 172 to have a wider base than lightweight subbase 100 and/or the utility truck (not shown).

In some embodiments, lightweight subbase 100 is coupled to first outrigger box 110a and second outrigger box 110b. In some embodiments, first outrigger box 110a and second outrigger box 110b comprise one or more hydraulic pistons 172. In some embodiments, one or more hydraulic pistons 172 are configured to extend below lightweight subbase 100 to provide a level surface for operation of a boom-arm 108.

In some embodiments, each of hydraulic pistons 172 is coupled to either first outrigger box 110a and/or second outrigger box 110b. Hydraulic pistons 172 may be powered directly by hydraulic line 122. In some embodiments, hydraulic line 122 is connected to hydraulic pump 160. In some embodiments, hydraulic line 122 is connected to one or more of compartments 152 of either first modular body 102a or second modular body 102b, wherein compartments 152 comprise a hydraulic pump 160.

In some embodiments, second outrigger box 110b is mounted to chassis 103 via sliding chassis brackets 174. Sliding chassis brackets 174 are slidable to ensure that lightweight subbase 100 does not receive longitudinal forces caused by changes in length of chassis 103. Sliding chassis brackets 174 are coupled to first outrigger box 110a and/or second outrigger box 110b. In some embodiments, sliding chassis brackets 174 are clamps, bolt-on plates, interlocking plates, or any other such mounting hardware. Each of sliding chassis brackets 174 may be discrete and/or different clamps that may be entirely different forms of brackets (e.g., bolt on plate, interlocking plates, clamps, rollers, or any other such mounting hardware). In some embodiments, sliding chassis brackets 174 may be configured to be rigid and clamp directly onto chassis 103 without sliding.

In some embodiments, first outrigger box 110a comprises rigid chassis brackets 176. Rigid chassis brackets 176 are configured to anchor lightweight subbase 100 to chassis 103 at one end. Thereby allowing sliding chassis brackets 174 (mounted opposite rigid chassis brackets 176) to slide along chassis 103 in the event that chassis 103 changes in length, deflects, or warps. Rigid chassis brackets 176 may be identical to sliding chassis brackets 174. In some embodiments, rigid chassis brackets 176 are interlocking plates, adhesive, C-clamps, bolt-on plates, or any other such rigid mounting hardware that prevents sliding between lightweight subbase 100 and chassis 103.

In some embodiments, first outrigger box 110a and second outrigger box 110b are coupled to lightweight subbase 100. First outrigger box 110a and second outrigger box 110b may be disposed on opposite ends of lightweight subbase 100. In some embodiments, first outrigger box 110a and second outrigger box 110b are integrally connected to lightweight subbase 100. For example, first outrigger box 110a and second outrigger box 110b may be welded to opposite ends of lightweight subbase 100. Additionally, first outrigger box 110a and second outrigger box 110b may be coupled to lightweight subbase 100 via any method of mounting (i.e., welding, bolts, clamps, etc.). Furthermore, first outrigger box 110a, second outrigger box 110b, lightweight subbase 100 and first modular body 102a and second modular body 102b may all be rigidly coupled together (i.e., all of the listed components do not move or slide in relation to each other).

Figure 3:
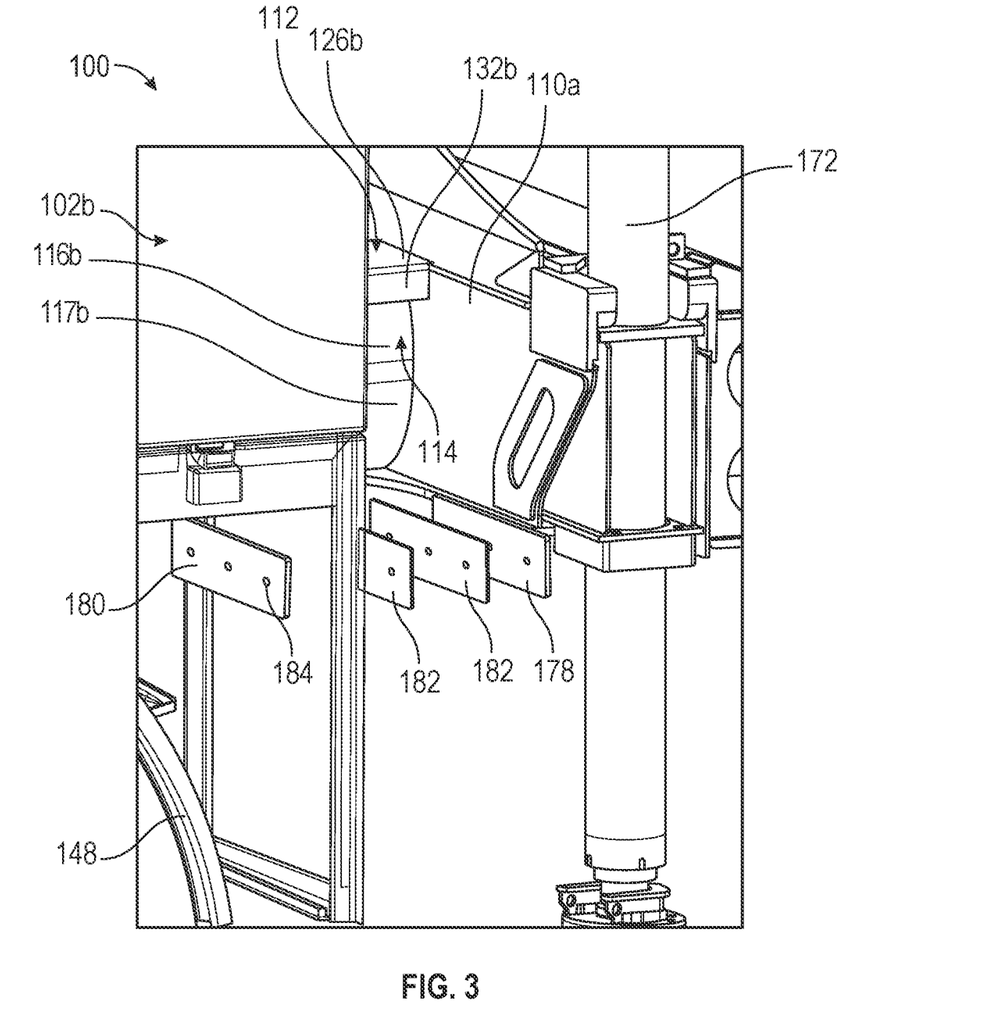
FIG. 3 illustrates a close-up view of a modular body coupled to an outrigger box for some embodiments.

FIG. 3 illustrates first modular body 102a mounted to first outrigger box 110a for some embodiments. In some embodiments, first outrigger box 110a and second outrigger box each comprise one or more body mounts 178. Each of body mounts 178 is configured to mount to first modular body 102a and/or second modular body 102b. In some embodiments, first modular body 102a and/or second modular body 102b each comprise outrigger bracket 180 configured to couple to body mounts 178. In some embodiments, comprise outrigger bracket 180, and each of body mounts 178 comprise holes adapted to accept a bolt. In some embodiments, one or more bolts may be run through the holes and fastened with a nut to prevent lateral movement of first modular body 102a and second modular body 102b by fastening first modular body 102a and second modular body 102b to first outrigger box 110a and second outrigger box 110b, which do not move in the lateral direction.

In some embodiments, first modular body 102a and second modular body 102b are positioned such that body mounts 178 are not contacting first modular body 102a and second modular body 102b. One or more shims 182 may be used to accommodate the distance between body mounts 178 and first modular body 102a/second modular body 102b and solidify mounting between first modular body 102a/second modular body 102b and body mounts 178. For example, Shims 182 are inserted between body mounts 178 and first modular body 102a such that mounting holes in one or more shims 182 and body mounts 178 align with mounting holes 184. As such mounting holes 184 may couple to one or more shims 182 and body mounts 178 to mount first modular body 102a and/or second modular body 102b to body mounts 178 and thereby to first outrigger box 110a and second outrigger box 110b. Shims 182 may comprise a plurality of shims. In some embodiments, one or more shims 182 is a single shim. Further, in some embodiments, the one or more shims 182 may be tapered based on a draft angle of the first modular body 102a or the second modular body 102b. Alternatively, shims 182 may be absent and first modular body 102a and second modular body 102b may be mounted directly to body mounts 178.

In some embodiments, body mounts 178 are configured to removably mount first modular body 102a and second modular body 102b to first outrigger box 110a and/or second outrigger box 110b. For example, first modular body 102a and second modular body 102b may be mounted to body mounts 178 using bolts as described above. Bolting first modular body 102a and second modular body 102b to body mounts 178 and thereby first outrigger box 110a and/or second outrigger box 110b allows first modular body 102a and second modular body 102b to be removed from lightweight subbase 100 without cutting apart lightweight subbase 100.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A modular subbase for mounting to a utility truck chassis, the modular subbase comprising:
   a longitudinal supporting structure configured to couple with the utility truck chassis, the longitudinal supporting structure comprising:
      a first upwardly-facing arm having a first arcuate trailing edge;
      a second upwardly-facing arm having a second arcuate trailing edge, the second upwardly-facing arm opposite the first upwardly-facing arm; and
      a medial portion disposed between the first upwardly-facing arm and the second upwardly-facing arm;
   an upper surface integrally coupled along at least a portion of a length of the longitudinal supporting structure, the upper surface comprising:
      a central portion;
      a first lateral edge extending beyond the longitudinal supporting structure, the first lateral edge having a first coupling surface; and
      a second lateral edge extending beyond the longitudinal supporting structure, the second lateral edge having a second coupling surface;
   a first modular body compartment removably mounted to the upper surface, the first modular body compartment comprising:
      a first storage cavity configured to extend perpendicularly regarding the upper surface; and
      a first lateral extending portion configured to rest on the first lateral edge;
   a second modular body compartment removably mounted to the upper surface, the second modular body compartment comprising:
      a second storage cavity configured to extend perpendicularly regarding the upper surface; and
      a second lateral extending portion configured to rest on the second lateral edge; and
   a boom arm pedestal integrally coupled to the longitudinal supporting structure by the upper surface.

2. The modular subbase of claim 1,
   wherein the first lateral extending portion is configured to mount to the first coupling surface, and
   wherein the second lateral extending portion is configured to mount to the second coupling surface.

3. The modular subbase of claim 1, wherein the modular subbase further comprises a modular staircase configured to mount to the first lateral edge and/or the second lateral edge.

4. The modular subbase of claim 1, wherein the longitudinal supporting structure and the upper surface further comprise one or more longitudinal reinforcing struts configured to provide resistance to lateral forces received by the longitudinal supporting structure.

5. The modular subbase of claim 1, further comprising:
   at least one first shim disposed on the first modular body compartment between a surface of the first modular body compartment and a first body mount,
      wherein the at least one first shim is tapered based on a draft angle of the first modular body compartment; and
   at least one second shim disposed on the second modular body compartment between a surface of the second modular body compartment and a second body mount,
      wherein the at least one second shim is tapered based on a draft angle of the first modular body compartment.

6. The modular subbase of claim 1, wherein the first upwardly-facing arm and the second upwardly-facing arm provide resisting forces to deflection of the modular subbase.

7. The modular subbase of claim 1, wherein the first upwardly-facing arm and the second upwardly-facing arm are coupled to the upper surface.

8. A modular subbase for mounting to a utility truck chassis, the modular subbase comprising:
   a longitudinal supporting structure configured to couple with the utility truck chassis, the longitudinal supporting structure comprising:
      a first upwardly-facing arm;
      a second upwardly-facing arm opposite the first upwardly-facing arm;
      a medial portion disposed between the first upwardly-facing arm and the second upwardly-facing arm; and
   an upper surface integrally coupled along a length of the longitudinal supporting structure, the upper surface comprising:

a central portion configured to provide a walkable surface for a user;

a first lateral edge extending beyond the longitudinal supporting structure, the first lateral edge having a first coupling surface; and a second lateral edge extending beyond the longitudinal supporting structure, the second lateral edge having a second coupling surface; and a first modular body compartment removably mounted to the upper surface, the first modular body compartment comprising:

a first storage cavity configured to extend perpendicularly regarding the upper surface; and a first lateral extending portion configured to rest on the first lateral edge; and a second modular body compartment removably mounted to the upper surface, the second modular body compartment comprising:

a second storage cavity configured to extend perpendicularly regarding the upper surface; and a second lateral extending portion configured to rest on the second lateral edge.

9. The modular subbase of claim 8, wherein the first lateral extending portion is configured to mount to the first coupling surface, and wherein the second lateral extending portion is configured to mount to the second coupling surface.

10. The modular subbase of claim 8, wherein the modular subbase further comprises a modular staircase configured to mount to the first lateral edge and/or the second lateral edge.

11. The modular subbase of claim 8, wherein the longitudinal supporting structure and the upper surface further comprise one or more longitudinal reinforcing struts configured to provide resistance to lateral forces along the longitudinal supporting structure.

12. The modular subbase of claim 8, wherein the upper surface and the longitudinal supporting structure are integrated with a boom-arm pedestal.

13. The modular subbase of claim 8, wherein the first upwardly-facing arm and the second upwardly-facing arm provide resisting forces to deflection of the modular subbase.

14. The modular subbase of claim 8, wherein the first upwardly-facing arm and the second upwardly-facing arm are coupled to the upper surface.

15. A system for supporting one or more modular body compartments on a utility truck chassis, the system comprising:

a modular subbase comprising:

a longitudinal supporting structure configured to couple with the utility truck chassis, the longitudinal supporting structure comprising:

a first upwardly-facing arm;

a second upwardly-facing arm opposite the first upwardly-facing arm; and a medial portion disposed between the first upwardly-facing arm and the second upwardly-facing arm; and an upper surface integrally coupled along a length of the longitudinal supporting structure, the upper surface comprising:

a central portion configured to provide a walkable surface for a user;

a first lateral edge extending beyond a maximum width of the longitudinal supporting structure, the first lateral edge having a first coupling surface; and a second lateral edge extending beyond the longitudinal supporting structure, the second lateral edge having a second coupling surface.

16. The system of claim 15, wherein the one or more modular body compartments comprise a modular staircase.

17. The system of claim 15, wherein the one or more modular body compartments are removably mountable and configurable to be arranged with the modular subbase to compact the modular subbase for transport.

18. The system of claim 15, wherein the modular subbase is configured to be bolted to the utility truck chassis.

19. The system of claim 15, wherein the longitudinal supporting structure comprises rounded edges to provide increased structural rigidity.

20. The system of claim 15, wherein the first lateral edge and the second lateral edge each comprise a vertically descending portion configured to resist rotational forces applied by the one or more modular body compartments.

* * * * *